US012567345B1

(12) United States Patent
King et al.

(10) Patent No.: US 12,567,345 B1
(45) Date of Patent: Mar. 3, 2026

(54) PALLET SIGNAGE APPARATUSES AND METHODS OF USING THE SAME

(71) Applicant: Retail First, Inc., Elgin, IL (US)

(72) Inventors: Brian King, Lakewood, IL (US); Frank Cannone, Barlett, IL (US)

(73) Assignee: Retail First, Inc., Elgin, IL (US)

( * ) Notice: Subject to any disclaimer, the term of this patent is extended or adjusted under 35 U.S.C. 154(b) by 0 days.

(21) Appl. No.: 19/086,433

(22) Filed: Mar. 21, 2025

(51) Int. Cl.
*G09F 7/18* (2006.01)
*B65D 19/38* (2006.01)
*G09F 23/00* (2006.01)

(52) U.S. Cl.
CPC ............... *G09F 7/18* (2013.01); *B65D 19/38* (2013.01); *G09F 23/00* (2013.01); *G09F 2007/1856* (2013.01)

(58) Field of Classification Search
CPC .... G09F 7/18; G09F 23/00; G09F 2007/1856; B65D 19/38; B65D 19/00; B65D 2519/00676; F16B 2/04; F16M 13/02; A47B 2200/0085
USPC ......... 108/51.11; 248/447.2, 346.01, 346.02, 248/346.03, 154, 121, 123.11, 123.2, 248/124.2; 206/386, 459.5, 595–600; 40/606.1, 607.01, 607.1, 607.11, 607.12
See application file for complete search history.

(56) References Cited

U.S. PATENT DOCUMENTS 1,786,459 A * 12/1930 Simons ................. A61J 9/0692 248/104
2,903,221 A * 9/1959 Landis ..................... B44D 3/14 248/231.51
3,015,177 A * 1/1962 Hembd ...................... G09F 1/10 248/223.41
7,617,627 B1 * 11/2009 Waidelich ............... G09F 15/00 40/607.1
8,607,725 B2 * 12/2013 Degirmenci ....... A63B 71/0672 116/222
9,366,022 B2 * 6/2016 Frey ...................... E04B 1/5831
10,068,438 B2 * 9/2018 Muntasser ............... G08B 5/02

* cited by examiner

*Primary Examiner* — Cassandra Davis
(74) *Attorney, Agent, or Firm* — Scherrer Patent & Trademark Law, P.C.; Stephen T. Scherrer; Monique A. Morneault

(57) ABSTRACT

Pallet sign apparatuses comprise a base configured to fit within a space between the top and bottom decks of a pallet or the top deck of the pallet and the ground and rigidly hold the same upright. Signage having indicia thereon is displayable on the pallet sign apparatus. Methods of using the same are further provided.

18 Claims, 3 Drawing Sheets

PALLET SIGNAGE APPARATUSES AND METHODS OF USING THE SAME

TECHNICAL FIELD

The present invention relates to pallet sign apparatuses. Specifically, the pallet sign apparatuses comprise a base configured to fit within a space between the top and bottom decks of a pallet or the top deck of the pallet and the ground and rigidly hold the same upright. Signage having indicia thereon is displayable on the pallet sign apparatus. Methods of using the same are further provided.

BACKGROUND

Pallets, often made of wood but also constructed from composite materials, are often and typically used for holding items thereon and for moving the same, such as with a forklift, a pallet mover, pallet jack, pallet truck, or other like apparatus. Specifically, pallets generally have top and bottom decks, each with a plurality of parallel spaced-apart laterally-disposed boards, and a plurality of longitudinal stringers or support blocks between the top and bottom decks. FIGS. 1A and 1B illustrate prior art illustrations of exemplary pallets showing typical board and stringer/support block configurations. Specifically, FIG. 1A illustrates a pallet 10 having support stringers 12 between the top and bottom decks 14, 16, with spaces 18 on ends thereof between the top and bottom decks 14, 16 and notches 20 in stringers 12 for placement of forks from a forklift or pallet jack. FIG. 1B illustrates a pallet 30 having support blocks 32 between the top and bottom decks 34, 36, with end spaces 38 on ends thereof between the top and bottom decks 34, 36 and side spaces 40 between support blocks 32 allowing for placement of forks therein. The spaces between the top and bottom decks and/or the top deck and the ground are typically used for forks of a forklift, or forks of a pallet jack to be placed for lifting and/or moving the pallets.

In many retail stores, pallets are used to hold a plurality of retail items thereon. Often, after loading a pallet with retail items and moving the same to a location in a retail store with a forklift or a pallet jack, for example, the pallet with the items thereon maintains its position in the retail store for display. In other words, rather than transfer the retail items from the pallet to a different retail display, the pallet itself and the retail items are simply placed in the desired locations within the retail store and displayed for customers. This may be particularly useful for heavy items where transference from the pallet to a separate retail display is difficult and time consuming.

It is often difficult, however, to display signage for the retail items on the pallets in the locations around the retail store. Because a pallet is not a traditional display unit, which typically includes standardized base unit infrastructure and, often, shelving, signage having indicia on it relating to the items displayed on the pallet is often difficult to place and maintain in desired locations. Typically, there are no traditional apertures or sign display structures that can be utilized. Sign stands are often loosely held on or near a display, but these can be knocked over or easily moved, such that the sign itself may not be viewable by consumers.

A need, therefore, exists for improved signage display apparatuses. Specifically, a need exists for improved signage display apparatuses that may be utilized with non-traditional retail store displays. More specifically, a need exists for improved signage display apparatuses that may be utilized with a pallet having retail items displayed thereon.

Moreover, a need exists for improved signage display apparatuses that are rigidly held in position when placed, especially when used as retail displays for retail items held and displayed on a pallet. Specifically, a need exists for improved signage display apparatuses that are easy to place and easy to remove from retail displays that utilize pallets. More specifically, a need exists for improved signage display apparatuses that rigidly hold signage and indicia in place.

SUMMARY OF THE INVENTION

The present invention relates to pallet sign apparatuses. Specifically, the pallet sign apparatuses comprise a base configured to fit within a space between the top and bottom decks of a pallet or the top deck of the pallet and the ground and rigidly hold the same upright. Signage having indicia thereon is displayable on the pallet sign apparatus. Methods of using the same are further provided.

To this end, in an embodiment of the present invention, a pallet signage apparatus is provided. The pallet signage apparatus comprises: a base comprising a first plate; a rod extending upwardly from the first plate; a movable platform comprising a second plate having an aperture therein, wherein the movable platform is slidable on the rod; a spring disposed between the base and the movable platform; and a signage platform extending from the rod wherein the signage platform comprises signage bearing indicia.

In an embodiment, the first plate and the second plate are roughly parallel to each other.

In an embodiment, the base comprises at least one reinforcement fin extending roughly perpendicular to the face of the first plate.

In an embodiment, the movable platform comprises at least one reinforcement fin extending roughly perpendicularly to the face of the second plate.

In an embodiment, the pallet signage apparatus further comprises a sleeve extending from the signage platform, wherein the sleeve is slidable disposed on the rod.

In an embodiment, the signage platform is removable from the rod.

In an embodiment, the movable platform comprises a tread pattern thereon.

In an embodiment, the movable platform comprises an upwardly sloped angle element extending from a side of the second plate.

In an embodiment, the movable platform comprises a downwardly sloped angle element extending from a side of the second plate.

In an embodiment, the pallet signage apparatus further comprises a ring extending upwardly from the base, wherein the rod extends from within the ring, and further wherein the spring is disposed within the ring thereby holding the spring in its place.

In an alternate embodiment of the present invention, a system for holding signage is provided. The system comprises: the pallet signage apparatus; and a pallet having a top deck, wherein the movable platform of the pallet signage apparatus is held beneath the top deck of the pallet and the base of the pallet signage apparatus is held above the bottom deck of the pallet or a floor.

In an alternate embodiment, a method for holding signage is provided. The method comprises the steps of: providing a pallet signage apparatus comprising a base comprising a first plate; a rod extending upwardly from the first plate; a movable platform comprising a second plate having an aperture therein, wherein the movable platform is slidable on the rod; a spring disposed between the base and the movable platform; and a signage platform extending from the rod wherein the signage platform comprises signage bearing indicia; providing a pallet having a top deck, a bottom deck, and a space beneath the top deck; pressing down on the movable platform to contract the spring; placing at least a portion of the base and the movable platform in the space beneath the top deck; releasing the movable platform allowing the spring to push upwardly against the movable platform, thereby holding the movable platform against the top deck of the pallet; and displaying indicia on the signage platform.

In an embodiment, the first plate and the second plate are roughly parallel to each other.

In an embodiment, the signage platform is removable from the rod.

In an embodiment, the signage platform comprises a sleeve extending from the signage platform, wherein the sleeve is slidably disposed on the rod, wherein the method further comprises the step of removing the signage platform from the rod by sliding the sleeve from the rod.

In an embodiment, the movable platform comprises a tread pattern thereon.

In an embodiment, the movable platform comprises an upwardly sloped angle element extending from a side of the second plate, wherein the method further comprises the step of: pressing on the upwardly sloped angle element to contract the spring.

In an embodiment, the movable platform comprises a downwardly sloped angle element extending from a side of the second plate.

In an embodiment, the base comprises an upwardly extending ring, wherein the rod extends from within the ring, and further wherein the spring is disposed within the ring, the method further comprising the step of: holding the spring in position within the ring.

It is, therefore, an advantage and objective of the present invention to provide improved signage display apparatuses.

Specifically, it is an advantage and objective of the present invention to provide improved signage display apparatuses that may be utilized with non-traditional retail store displays.

More specifically, it is an advantage and objective of the present invention to provide improved signage display apparatuses that may be utilized with a pallet having retail items displayed thereon.

Moreover, it is an advantage and objective of the present invention to provide improved signage display apparatuses that are rigidly held in position when placed, especially when used as retail displays for retail items held and displayed on a pallet.

Specifically, it is an advantage and objective of the present invention to provide improved signage display apparatuses that are easy to place and easy to remove from retail displays that utilize pallets.

More specifically, it is an advantage and objective of the present invention to provide improved signage display apparatuses that rigidly hold signage and indicia in place.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to pallet sign apparatuses. Specifically, the pallet sign apparatuses comprise a base configured to fit within a space between the top and bottom decks of a pallet or the top deck of the pallet and the ground and rigidly hold the same upright. Signage having indicia thereon is displayable on the pallet sign apparatus. Methods of using the same are further provided.

Figure 1A:
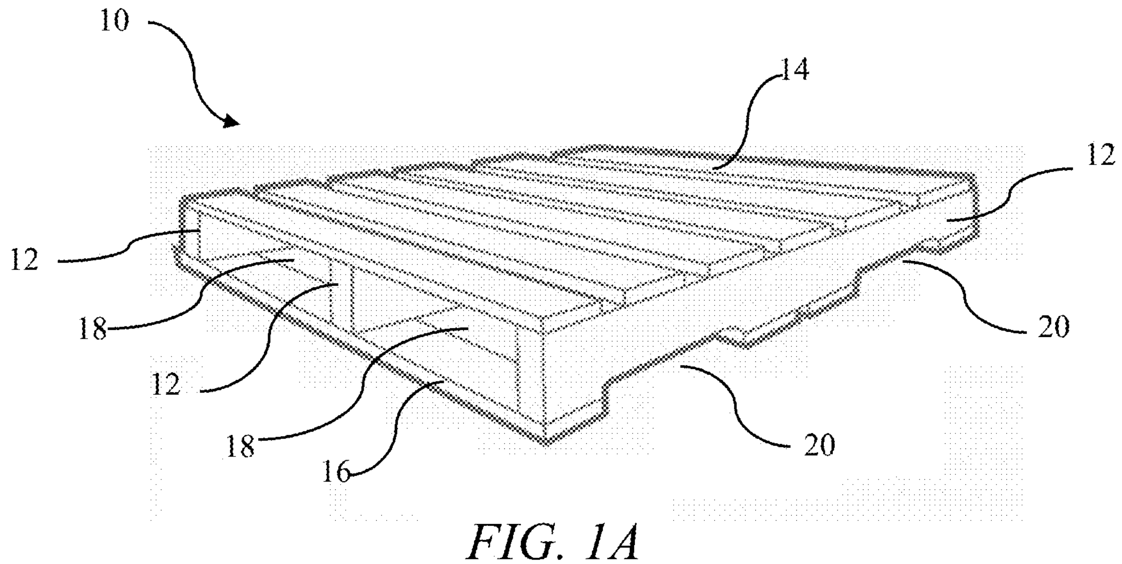
FIG. 1A (PRIOR ART)
FIGS. 1A and 1B illustrate exemplary prior art pallets that are often used for retail displays.
Figure 1B:
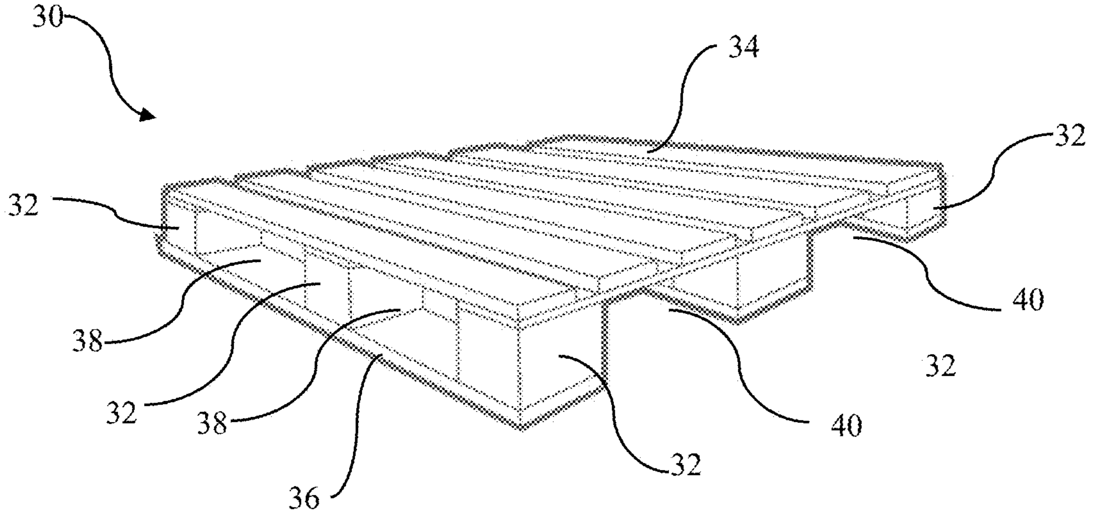
FIG. 1B (PRIOR ART)
Figure 2:
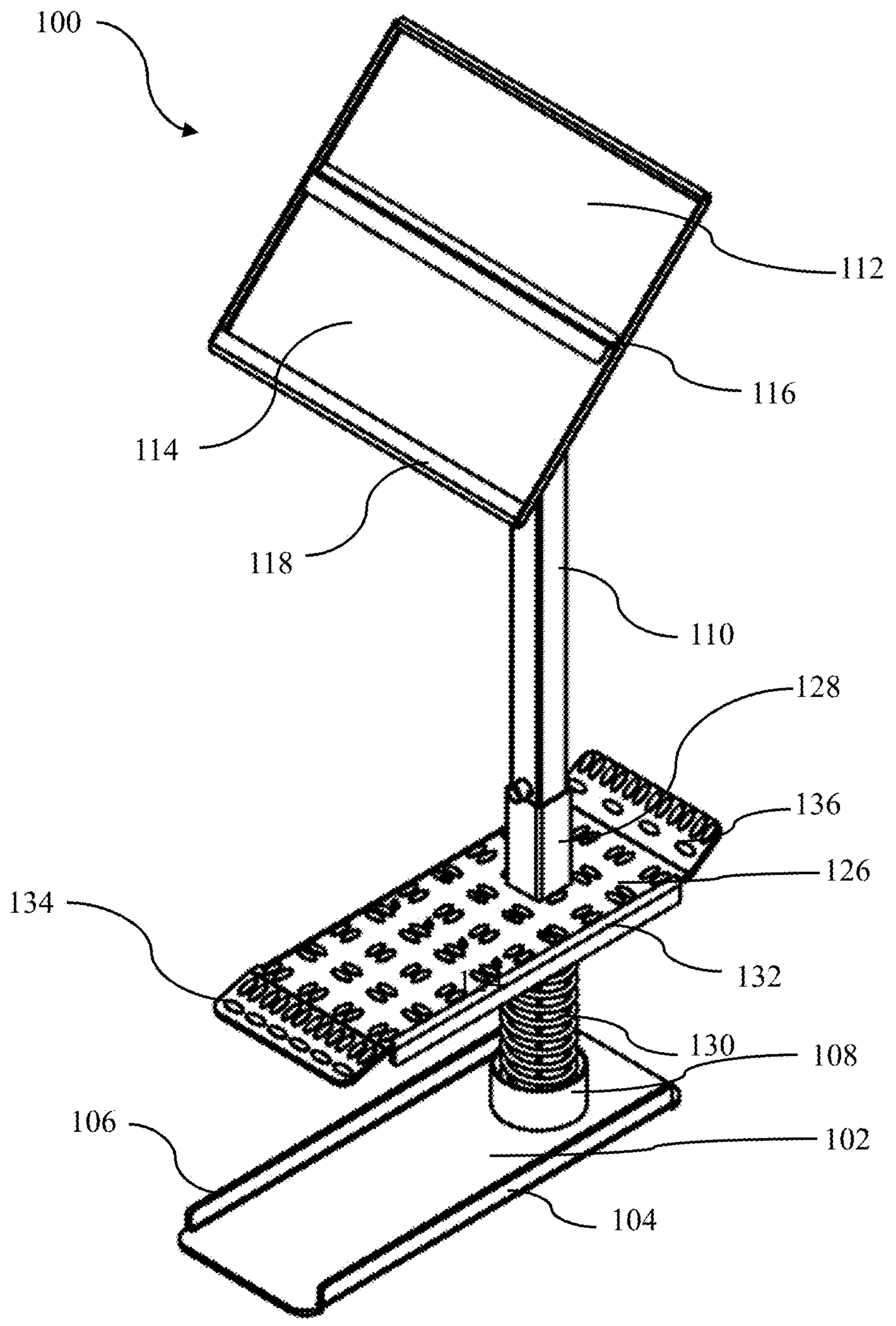
FIG. 2 illustrates a perspective view of a pallet signage apparatus in an embodiment of the present invention.

Now referring to the figures, wherein like numerals refer to like parts, FIG. 2 illustrates a pallet signage apparatus 100 in an embodiment of the present invention. The pallet signage apparatus 100 may be used for providing signage, including indicia thereon, such as retail information concerning products stored and/or held on a pallet.

The pallet signage apparatus 100 comprises a base 102 comprising a plate, typically of metal or other strong resilient material, further having reinforcement fins 104, 106 on opposite sides thereof. The base 102 may further be sized and shaped to rest flat on a floor or the ground without being unstable or tipping. On an end of the plate may be a ring 108 from which a rod or pole 110 may extend. The rod or pole 110 may terminate on a top end at a signage platform 112, which may be disposed at an angle extending from the top end of the rod or pole 110 so that the face 114 may be viewed by consumers, such as retailers, who may wish to view indicia or signage that may be disposed thereon. For example, the face 114 of the signage platform 112 may include upper and lower slots 116, 118, respectively, which may allow cards or other like material to be slid therein. In a preferred embodiment, cards or other material that comprises indicia that is viewable by consumers may be held between the upper and lower slots 116, 118, and may include information concerning retail items, such as price, a sku number, a bar code, an image, or other like indicia.

The rod or pole 110 may have sections therein and may be extendible to make taller or shorter depending on necessity. Specifically, first and second spring buttons 120, 122 may extend from the rod or pole 110 and may allow sections of the rod or pole 110 to extend or retract when pressed. The second spring button 122 may alternatively hold a sleeve 124 extending downwardly from the signage platform 112 for holding the signage platform 112 in place on the top end of the rod or pole 110, as illustrated in FIG. 3.

A movable platform 126 having a movable platform sleeve 128 extending from a top thereof may be slidable disposed on the rod or pole 110, which may freely move upwardly or downwardly along the rod or pole 110 through the movable platform sleeve 128. The movable platform 126 may be sized and shaped to roughly extend parallel to the base 102. A spring 130 may be disposed between the base 102 and the movable platform 126 thereby holding the movable platform 126 a distance above the base 102. Preferably, the spring 130 may be held within the ring 108, thereby keeping it in the proper position and orientation. Further, the movable platform 126 may have reinforcement fins 132 on sides thereof and may further include other features for moving and holding the same within a pallet, as described below.

Figure 3:
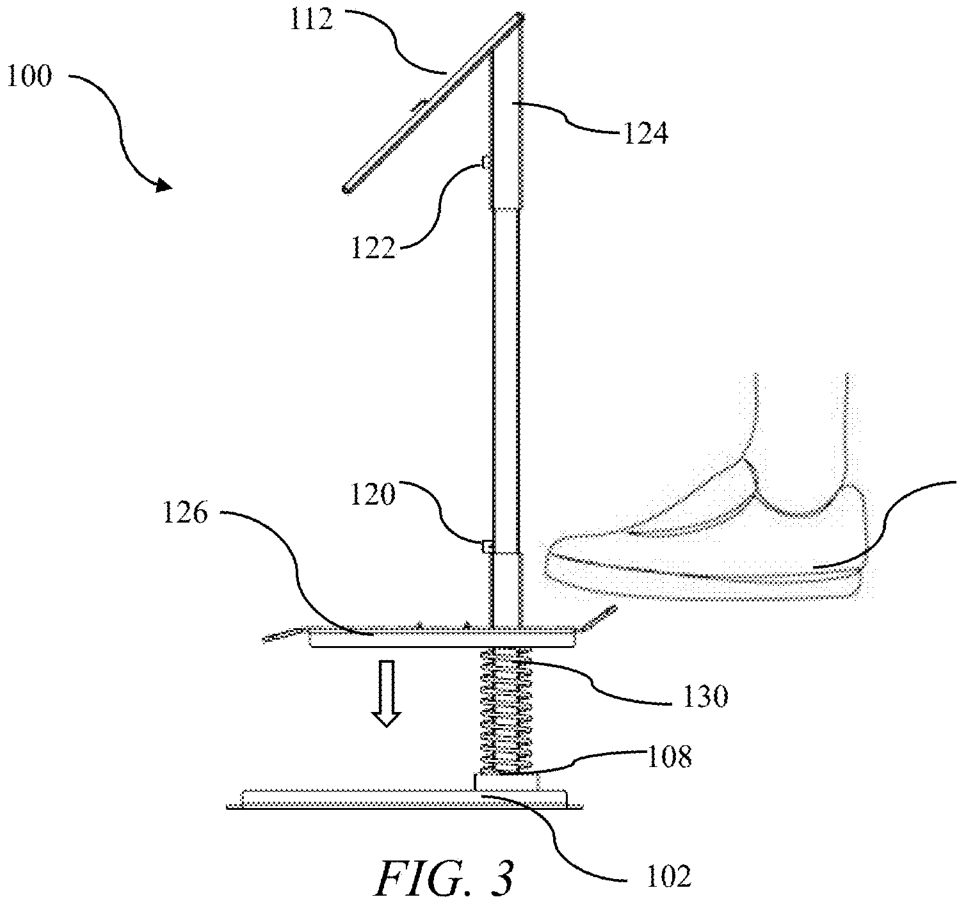
FIG. 3 illustrates a side view of a pallet signage apparatus in an embodiment of the present invention.
Figure 4:
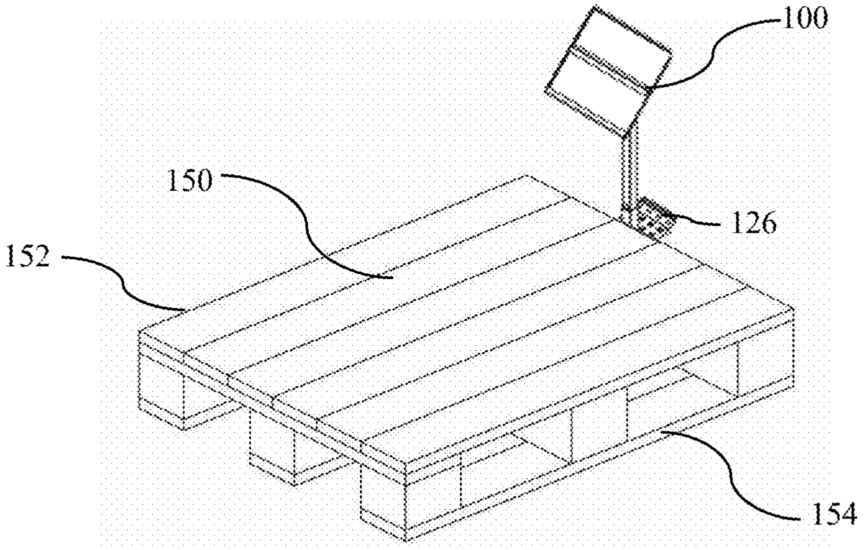
FIG. 4 illustrates a raised perspective view of a pallet having a pallet signage apparatus disposed therein in an embodiment of the present invention.

For example, the movable platform 126 may have a patterned tread thereon which may be useful for providing a grip for both a user's shoe 140, as shown in FIG. 3, and a bottom surface of a top deck 150 of a pallet 152, as shown in FIG. 4. On a first end of the movable platform 126 may be a downwardly sloped angle element 134 that allows the movable platform to be more easily placed beneath the top deck of a pallet when installing the same without catching on elements of the pallet 152. In addition, an upwardly sloped angle element 136 may extend from a second end of the movable platform 126, which may allow a user's shoe or boot 140 to press down on the movable platform 126 against the spring 130.

As shown in FIG. 3, user's shoe or boot 140 may press down on the upwardly sloped angle element 136 to push the movable platform 126 down by pushing against the spring 130. The user may then place the movable platform 126 beneath the top deck 150 of the pallet 152, as shown in FIG. 4, whereupon the user may release his or her shoe from the upwardly sloped angle element 136, thereby releasing the spring 130. Upon doing so, the upper surface of the movable platform 126 may be held against a bottom surface of the top deck 150 of the pallet 152 holding the same in place. The base 102 may be held against a floor or the ground, if the pallet is open to the floor or ground at this location, or a top surface of a bottom deck 154 of the pallet. The spring 130 may therefore push the opposing base 102 and movable platform 130 away from each other, holding the apparatus 100 in place between the top deck 150 of the pallet 152 and the ground or between the top deck 150 of the pallet 152 and the bottom deck of the pallet 152.

Once placed into position under the top deck 150 of the pallet 152, the signage platform 112 may be used to display indicia. Items may be held or stored on the pallet 152 and the indicia on the signage platform 112 may relate to the items held or stored on the pallet.

In a preferred embodiment, the pallet 152 is positioned on the floor or the ground of a retail store or establishment and retail items are held on the top deck 150 of the pallet 152. The pallet signage apparatus 100 may be placed into position beneath the top deck 152 of the pallet 150, as shown in FIG. 4, and held in place thereunder due to the spring 130 pushing the movable platform 126 into the bottom surface of the top deck 150. The pallet signage apparatus 100 may preferably comprise retail information concerning the items on the pallet 152, which may be held on the face 114 of the signage platform 112, such as between the slots 116, 118, or otherwise as desired.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A pallet signage apparatus comprising:

a base comprising a first plate;

a rod extending upwardly from the first plate;

a movable platform comprising a second plate having an aperture therein, wherein the rod is disposed through the aperture in the second plate, wherein the movable platform is slidable on the rod, wherein the first plate and the second plate are roughly parallel to each other;

a spring disposed between the base and the movable platform, wherein the spring biases the movable platform along the rod away from the base; and a signage platform extending from the rod wherein the signage platform comprises signage bearing indicia.

2. The pallet signage apparatus of claim 1 wherein the base comprises at least one reinforcement fin extending roughly perpendicular to a face of the first plate.

3. The pallet signage apparatus of claim 1 wherein the movable platform comprises at least one reinforcement fin extending roughly perpendicular to a face of the second plate.

4. The pallet signage apparatus of claim 1 further comprising:

a sleeve extending from the signage platform, wherein the sleeve is slidably disposed on the rod.

5. The pallet signage apparatus of claim 1 wherein the signage platform is removable from the rod.

6. The pallet signage apparatus of claim 1 wherein the movable platform comprises a tread pattern thereon.

7. The pallet signage apparatus of claim 1 wherein the movable platform comprises an upwardly sloped angle element extending from a side of the second plate.

8. The pallet signage apparatus of claim 1 wherein the movable platform comprises a downwardly sloped angle element extending from a side of the second plate.

9. The pallet signage apparatus of claim 1 further comprising:

a ring extending upwardly from the base, wherein the rod extends from within the ring, and further wherein the spring is disposed within the ring thereby holding the spring in its place.

10. A system for holding signage comprising:

the pallet signage apparatus of claim 1; and a pallet having a top deck and a bottom deck, wherein the movable platform of the pallet signage apparatus is held beneath the top deck of the pallet and the base of the pallet signage apparatus is held above the bottom deck of the pallet or a floor, wherein the spring biases the base against the bottom deck of the pallet or the floor and further wherein the spring biases the movable platform against the top deck of the pallet.

11. A method for holding signage, the method comprising the steps of:

providing a pallet signage apparatus comprising a base comprising a first plate; a rod extending upwardly from the first plate; a movable platform comprising a second plate having an aperture therein, wherein the movable platform is slidable on the rod; a spring disposed between the base and the movable platform; and a signage platform extending from the rod wherein the signage platform comprises signage bearing indicia;

providing a pallet having a top deck, a bottom deck, and a space beneath the top deck;

pressing down on the movable platform to contract the spring;

placing at least a portion of the base and the movable platform in the space beneath the top deck;

releasing the movable platform allowing the spring to push upwardly against the movable platform, thereby holding the movable platform against the top deck of the pallet; and displaying indicia on the signage platform.

12. The method of claim 11 wherein the first plate and the second plate are roughly parallel to each other.

13. The method of claim 11 wherein the signage platform is removable from the rod.

14. The method of claim 11 wherein the signage platform comprises a sleeve extending from the signage platform, wherein the sleeve is slidably disposed on the rod, wherein the method further comprises the step of:

removing the signage platform from the rod by sliding the sleeve from the rod.

15. The method of claim 11 wherein the movable platform comprises a tread pattern thereon.

16. The method of claim 11 wherein the movable platform comprises an upwardly sloped angle element extending from a side of the second plate, wherein the method further comprises the step of:

pressing on the upwardly sloped angle element to contract the spring.

17. The method of claim 11 wherein the movable platform comprises a downwardly sloped angle element extending from a side of the second plate.

18. The method of claim 11 wherein the base comprises an upwardly extending ring, wherein the rod extends from within the ring, and further wherein the spring is disposed within the ring, the method further comprising the step of:

holding the spring in position within the ring.

* * * * *